United States Patent [19]
Lesher et al.

[11] 3,882,132
[45] May 6, 1975

[54] PREPARATION OF 1-ALKYL-1,4-DIHYDRO-7-SUBSTITUTED-4-OXO-1,8-NAPHTHYRIDINE-3-CARBOXYLIC ACIDS VIA THE 3-AMINOMETHYL ANALOGS

[75] Inventors: George Y. Lesher, Schodack; Monte D. Gruett, East Greenbush, both of N.Y.

[73] Assignee: Sterling Drug Inc., New York, N.Y.

[22] Filed: Mar. 8, 1973

[21] Appl. No.: 339,090

[52] U.S. Cl... 260/295.5 B; 260/295 N; 260/296 N; 424/266
[51] Int. Cl............................................. C07d 31/36
[58] Field of Search...... 260/296 N, 295.5 B, 295 N

[56] References Cited
UNITED STATES PATENTS
3,149,104  9/1964  Lesher et al. ................ 260/295.5 B OTHER PUBLICATIONS
House et al., J. of Organic Chemistry, Vol. 29, No. 6, Pages 1339–41, June, 1964 QD 241 J.6.
Cummings et al., J. of Organic Chemistry, Vol. 25, No. 3, Pages 419–23, March, 1960 QD 241 J.6.
Klingsberg, Pyridine and its Derivatives, Part 3, Pages 181–191, Interscience Publishers, (1962) QD 401 K5 C.2.

Primary Examiner—Alan L. Rotman
Attorney, Agent, or Firm—Robert K. Bair; B. Woodrow Wyatt

[57] ABSTRACT

Process of reacting 1,4-dihydro-4-oxo-7-Q-1,8-naphthyridine (I) with a lower-tertiary-aminomethylating agent to produce 1,4-dihydro-3-($R_1R_2NCH_2$)-4-oxo-7-Q-1,8-naphthyridine II, reacting II with a lower-alkylating agent to produce 1-(lower-alkyl)-1,4-dihydro-3-($R_1R_2NCH_2$) -4-oxo-7-Q-1,8-naphthyridine (III), and oxidizing III to produce 1-(lower-alkyl)-1,4-dihydro-4-oxo-7-Q-1,8-naphthyridine-3-carboxylic acid (IV), where Q is lower-alkyl, loweralkanoyloxymethyl, 4(or 3)-pyridyl or 4(or 3)-pyridyl having one or two lower-alkyl substituents. The final products (IV) are known antibacterial agents, as are the corresponding 7-hydroxymethyl compounds which are prepared by hydrolysis of the final products where Q is 7-(lower-alkanoyloxymethyl). A further process comprises reacting 1,4-dihydro-7-methyl-4-oxo-1,8-naphthyridine-8-oxide (V) with a lower-tertiary-aminomethylating agent to produce 1,4-dihydro-3-($R_1R_2NCH_2$) -7-methyl-4-oxo-1,8-naphthyridine-8-oxide (VI) and oxidizing VI to produce 3-carboxy-1,4-dihydro-7-methyl-4-oxo-1,8-naphthyridine-8-oxide (VII). The 8-oxide (VII) is converted in three steps via the 7-(lower-alkanoyloxymethyl) compound to 1-ethyl-1,4-dihydro-7-hydroxymethyl-4-oxo-1,8-naphthyridine-3-carboxylic acid.

6 Claims, No Drawings

PREPARATION OF 1-ALKYL-1,4-DIHYDRO-7-SUBSTITUTED-4-OXO-1,8-NAPHTHYRIDINE-3-CARBOXYLIC ACIDS VIA THE 3-AMINOMETHYL ANALOGS

PROCESS AND INTERMEDIATES

This invention relates to steps in the process of preparing 1,8-naphthyridine-3-carboxylic acids and to compositions used therein.

The invention in a process aspect comprises the combination of the three steps of reacting 1,4-dihydro-4-oxo-7-Q-1,8-naphthyridine (I), which is tautomeric with 4-hydroxy-7-Q-1,8-naphthyridine (IA), with a lower-tertiary-aminomethylating agent to produce 1,4-dihydro-3-($R_1R_2NCH_2$)-4-oxo-7-Q-1,8-naphthyridine (II), which is tautomeric with 4-hydroxy-3-($R_1R_2NCH_2$)-7-Q-1,8-naphthyridine (IIA), reacting II (or IIA) with a lower-alkylating agent to produce 1-(lower-alkyl)-1,4-dihydro-3-($R_1R_2NCH_2$)-4-oxo-7-Q-1,8-naphthyridine (III), and reacting III with an oxidizing agent capable of converting —$CH_2NR_1R_2$ to —COOH to produce 1-(lower-alkyl)-1,4-dihydro-4-oxo-7-Q-1,8-naphthyridine-3-carboxylic acid (IV), where Q is lower-alkyl, lower-alkanoyloxymethyl, 4(or 3)-pyridyl or 4(or 3)-pyridyl having one or two lower-alkyl substituents, $R_1$ and $R_2$ are each lower-alkyl or, optionally, $NR_1R_2$ is piperidino, pyrrolidino, morpholino or such saturated N-heteromonocyclic radicals having one or two lower-alkyl substituents. The final products (IV) are known antibacterial agents, as are the corresponding 7-hydroxymethyl compounds which are prepared by hydrolysis of the final products where Q is lower-alkanoyloxymethyl. In addition to said combination of the 3 steps, other process aspects of the invention are each individual step and the two consecutive combinations of 2 steps.

The invention in its composition aspect resides in the compounds: 1,4-dihydro-3-($R_1R_2NCH_2$)-4-oxo-7-Q-1,8-naphthyridine and its tautomeric 4-hydroxy-3-($R_1R_2NCH_2$)-7-Q-1,8-naphthyridine of the respective formulas II and IIA

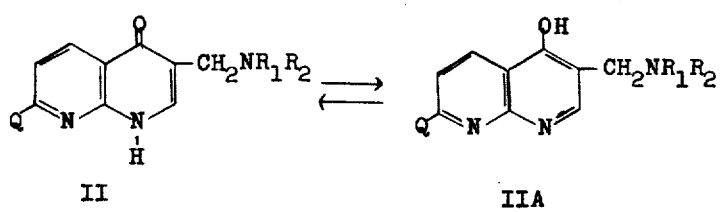

and 1-(lower-alkyl)-1,4-dihydro-3-($R_1R_2NCH_2$)-4-oxo-7-Q-1,8-naphthyridine of formula III

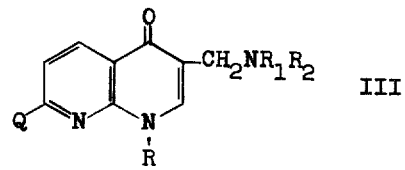

where R is lower-alkyl and $R_1$, $R_2$ and Q in each of the formulas II, IIA and III are defined as hereinabove.

The compounds of formulas II, IIA and III are disclosed and claimed in copending application Ser. No. 453,927, filed Mar. 22, 1974.

Another process aspect of the invention comprises the two-step combination as well as the individual steps of reacting 1,4-dihydro-7-methyl-4-oxo-1,8-naphthyridine-8-oxide (V), which is tautomeric with 4-hydroxy-7-methyl-1,8-naphthyridine-8-oxide (VA), with a lower-tertiary-aminomethylating agent to produce 1,4-dihydro-3-($R_1R_2NCH_2$)-7-methyl-4-oxo-1,8-naphthyridine-8-oxide (VI), which is tautomeric with 4-hydroxy-3-($R_1R_2NCH_2$)-7-methyl-1,8-naphthyridine-8-oxide (VIA), and reacting VI (or VIA) with an oxidizing agent capable of converting —$CH_2NR_1R_2$ to —COOH to produce 3-carboxy-1,4-dihydro-7-methyl-4-oxo-1,8-naphthyridine-8-oxide (VII), which is tautomeric with 3-carboxy-4-hydroxy-7-methyl-1,8-naphthyridine-8-oxide (VIIA). The 8-oxide (VII or VIIA) is then converted by known means to produce 1-ethyl-1,4-dihydro-7-hydroxymethyl-4-oxo-1,8-naphthyridine-3-carboxylic acid by first reacting it (or its lower-alkyl ester) with a lower-alkanoic acid anhydride to produce 7-(lower-alkanoyloxymethyl)-1,4-dihydro-4-oxo-1,8-naphthyridine-3-carboxylic acid (or its lower-alkyl ester), ethylating the latter to produce 7-(lower-alkanoyloxymethyl)-1-ethyl-1,4-dihydro-4-oxo-1,8-naphthyridine-3-carboxylic acid (or its lower-alkyl ester) and heating the latter with aqueous alkali metal hydroxide solution to produce said corresponding 7-hydroxymethyl-1,8-naphthyridine-3-carboxylic acid.

Because of their ready availability and the relatively low cost of intermediates and because of the high antibacterial activity of the corresponding final products, preferred embodiments in the process and composition aspects of the invention are those compounds where Q is methyl, acetoxymethyl, 4(or 3)-pyridyl, 2-methyl-4-pyridyl or 2,6-dimethyl-4-pyridyl, R is ethyl, and $NR_1R_2$ is di-(lower-alkyl)amino, particularly preferred embodiments being those compounds where $NR_1R_2$ is dimethylamino or diethylamino.

The term "lower-alkyl," as used herein, e.g., as represented by R in formula III or as a substituent of 4(or 3)-pyridyl when represented by Q in formulas II, IIA or III, means alkyl radicals having from 1 to 6 carbon atoms which can be arranged on straight or branched chains, illustrated by methyl, ethyl, n-propyl, isopropyl, n-butyl, sec-butyl, isobutyl, n-amyl, n-hexyl, and the like.

The term "lower-alkanoyl," as used herein, e.g., in the definition of the Q substituent as lower-alkanoyloxymethyl in formulas II, IIA or III, means alkanoyl radicals having from 1 to 6 carbon atoms, including the straight-and branched-chain radicals, illustrated by formyl, acetyl, propionyl (propanoyl), butyryl (butanoyl), isobutyryl (2-methylpropanoyl) and caproyl (hexanoyl).

Illustrative of the Q substituent in formulas II, IIA or III where Q is 4(or 3)-pyridyl having one or two lower-alkyl substituents are the following: 2-methyl-4-pyridyl, 2,6-dimethyl-4-pyridyl, 3-methyl-4-pyridyl, 2-methyl-3-pyridyl, 6-methyl-3-pyridyl (preferably named 2-methyl-5-pyridyl), 2,3-dimethyl-4-pyridyl, 2,5-dimethyl-4-pyridyl, 2-ethyl-4-pyridyl, 2-isopropyl-4-pyridyl, 2-n-butyl-4-pyridyl, 2-n-hexyl-4-pyridyl, 2,6-diethyl-4-pyridyl, 2,6-diethyl-3-pyridyl, 2,6-diethyl-4-pyridyl, 2,6-diethyl-3-pyridyl, 2,6-diisopropyl-4-pyridyl, 2,6-di-n-hexyl-4-pyridyl, and the like.

As shown above, 1,4-dihydro-3-($R_1R_2NCH_2$)-7-Q-4-oxo-1,8-naphthyridine of formula II is tautomeric with 4-hydroxy-3-($R_1R_2NCH_2$)-7-Q-1,8-naphthyridine of formula IIA. As with all tautomeric systems, the rate of the transformation II⇌IIA and the ratio II/IIA are dependent on the thermodynamic environment, including the state of aggregation; so that measurements by any particular techniques do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as II and the names of the compounds herein therefore are preferably based on structure II, although it is understood that either or both structures are comprehended.

The intermediate 1,4-dihydro-4-oxo-7-Q-1,8-naphthyridines (I) or tautomers (IA) are either known or, where novel, are prepared from known compounds by methods illustrated hereinbelow.

One such method, which is disclosed and claimed in copending application Ser. No. 453,927, filed Feb. 22, 1973, comprises the steps of reacting cyclic alkylidenyl N-(6-Q-2-pyridyl)aminomethylenemalonate, where Q is lower-alkyl, 4(or 3)-pyridyl, or 4(or 3)-pyridyl having one or two lower-alkyl substituents, with an oxidizing agent capable of converting pyridines to pyridine-N-oxides to produce cyclic alkylidenyl N-(6-Q'-1-oxo-2-pyridyl)aminomethylenemalonate, where Q' is lower-alkyl, 1-oxo-4(or 3)-pyridyl or 1-oxo-4(or 3)-pyridyl having one or two lower-alkyl substituents, heating said 6-Q'-1-oxo-2-pyridyl compound to produce 1,4-dihydro-4-oxo-7-Q'-1,8-naphthyridine-8-oxide and then converting said 8-oxide to the corresponding 1,4-dihydro-4-oxo-7-Q-1,8-naphthyridine. Illustrations of this method are given below in Examples 76–122.

The molecular structures of the composition aspects (II, IIA and III) of our invention were assigned on the basis of evidence provided by infrared, ultraviolet and nuclear magnetic resonance spectra, by chromatographic mobilities, and, by the correspondence of calculated and found values for the elementary analyses for representative examples.

The manner of making and using the instant invention will now be generally described so as to enable a person skilled in the art of chemistry to make and use the same, as follows:

The reaction of 1,4-dihydro-4-oxo-7-Q-1,8-naphthyridine (I) or its tautomeric 4-hydroxy-7-Q-1,8-naphthyridine (IA) with a lower-tertiary-aminomethylating agent to produce 1,4-dihydro-3-($R_1R_2NCH_2$)-4-oxo-7-Q-1,8-naphthyridine (II) or its tautomeric 4-hydroxy-3-($R_1R_2NCH_2$)-7-Q-1,8-naphthyridine (IIA) is carried out preferably by reacting I (or IA) with aqueous formaldehyde and a lower-secondary-amine of the formula $R_1R_2NH$ where $R_1$ and $R_2$ are defined as hereinabove, the combination of formaldehyde and lower-secondary-amine here being the lower-tertiary-aminomethylating agent, which generally comprehends any equivalent reagent or combination of reagents providing a lower-tertiary-aminomethyl group. The reaction is conveniently run in a lower-alkanol, preferably in refluxing ethanol, or in any other suitable solvent which is inert under the reaction conditions. The product (II or IIA) can be isolated in its free base form as its acid addition salt, e.g., hydrochloride, sulfate, methanesulfonate, p-toluenesulfonate, and the like.

The reaction of 1,4-dihydro-3-($R_1R_2NCH_2$)-4-oxo-7-Q-1,8-naphthyridine (II) or its tautomeric 4-hydroxy-3-($R_1R_2NCH_2$)-7-Q-1,8-naphthyridine (IIA) with a lower-alkylating agent to produce 1-(lower-alkyl)-1,4-dihydro-3-($R_1R_2NCH_2$)-4-oxo-7-Q-1,8-naphthyridine (III) is generally carried out by reacting said compound of formula II or IIA with a lower-alkyl ester of a strong inorganic acid or an organic sulfonic acid, said ester having the formula R-An, where An is an anion of a strong inorganic acid or an organic sulfonic acid, e.g., chloride, bromide, iodide, sulfate, methanesulfonate, benzenesulfonate, and para-toluenesulfonate, and R is lower-alkyl. This alkylation is preferably run using one molar equivalent quantity of the alkylating agent and preferably adding it slowly to II (or IIA). Alternatively, two or more molar equivalent quantities of alkylating agent (R-An) can be used to produce the 3-(lower-quaternary-ammonium-methyl salt) of III, that is N-$R_1$-N-$R_2$-N-R-N[1-(lower-alkyl)-1,4-dihydro-4-oxo-7-Q-1,8-naphthyridine-3-yl]methylammonium salt (An), which, like III, also can be oxidized to the corresponding 3-carboxylic acid (IV) by the procedure described hereinbelow.

In the alkylation step of the invention, the chloride, bromide or iodide is preferred because of the ready availability of the requisite lower-alkyl halides; and the reaction is carried out preferably in the presence of an acid-acceptor. The acid-acceptor is a basic substance which preferably forms freely water-soluble byproducts easily separable from the product of the reaction, including for example, sodium hydroxide, potassium hydroxide, sodium carbonate, potassium carbonate, sodium alkoxides, potassium alkoxides, sodium amide, and the like. The acid-acceptor takes up the hydrogen halide (or HAn) which is split out during the course of the reaction. The reaction is preferably carried out in the presence of a suitable solvent which is inert under the reaction conditions, e.g., a solvent such as lower-alkanol, acetone, dioxane, dimethylformamide, dimethyl sulfoxide, hexamethyl phosphoramide, or a mixture of solvents, e.g., a mixture of water and a lower-alkanol. The reaction is generally carried out at a temperature between about room temperature (about 20°–25°C.) and 150°C., preferably heating on a steam bath in a stirred mixture of dimethylformamide and anhydrous potassium carbonate.

The reaction of 1-(lower-alkyl)-1,4-dihydro-3-($R_1R_2NCH_2$)-4-oxo-7-Q-1,8-naphthyridine (III) with an oxidizing agent to produce 1-(lower-alkyl)-1,4-dihydro-4-oxo-7-Q-1,8-naphthyridine-3-carboxylic acid (IV) is generally carried out by reacting III with an oxidizing agent capable of converting lower-tertiary-aminomethyl to carboxy. The oxidation is conveniently and preferably run using an alkali permanganate, e.g., $KMnO_4$, in a basic medium, preferably in pyridine which also acts as solvent. Two to three moles of potassium permanganate per mole of the 3—($R_1R_2NCH_2$) compound are preferably used. The reaction is run at a low temperature, preferably below 20°C. As noted above, this oxidative step to form the 3-carboxylic acid (IV) can be carried out by said procedure using the corresponding N-$R_1$-N-$R_2$-N-R-N[1-(lower-alkyl)-1,4-dihydro-4-oxo-7-Q-1,8-naphthyridine-3-yl]methylammonium salt (An).

The best mode contemplated for carrying out the invention is now set forth as follows:

EXAMPLE 1

3-Diethylaminomethyl-1,4-dihydro-7-methyl-4-oxo-1,8-naphthyridine

A mixture containing 16 g. of 1,4-dihydro-7-methyl-4-oxo-1,8-naphthyridine, 10 ml. of 40% aqueous formaldehyde solution, 8.4 g. of diethylamine and 90 ml. of ethanol was refluxed for 2 hours and then heated in vacuo on a steam bath to dryness. The solid residue was crystallized from ethyl acetate and dried in vacuo at 80°C. to yield 10.3 g. of 3-diethylaminomethyl-1,4-dihydro-7-methyl-4-oxo-1,8-naphthyridine, m.p. 180°–181°C. with decomposition. Treatment of an ether solution of a sample of said product with ethanolic hydrogen chloride precipitated its hydrochloride salt which was triturated with acetone and air-dried to yield 3-diethylaminomethyl-1,4-dihydro-7-methyl-4-oxo-1,8-naphthyridine hydrochloride, m.p. 225°–227°C.

EXAMPLE 2

1-Ethyl-3-diethylaminomethyl-1,4-dihydro-7-methyl-4-oxo-1,8-naphthyridine

To a stirred suspension heated on a steam bath and containing 2.45 g. of 1,4-dihydro-3-diethylaminomethyl-7-methyl-4-oxo-1,8-naphthyridine in 25 ml. of dimethylformamide is added 3.4 g. of anhydrous potassium carbonate and the mixture is stirred for about fifteen minutes. To the stirred hot mixture is added dropwise a solution of 1.56 g. of ethyl iodide in 7 ml. of dimethylformamide and the resulting mixture is stirred with heating on the steam bath for ninety minutes. The hot reaction mixture is filtered and the filtrate chilled. The resulting crystalline precipitate is collected, triturated with warm water, washed sparingly with warm water and dried in vacuo at 60°C. to yield 1-ethyl-3-diethylaminomethyl-1,4-dihydro-7-methyl-4-oxo-1,8-naphthyridine. If desired, this compound can be recrystallized from dimethylformamide. Following the above procedure but using twice as much or more of the ethyl iodide there is obtained the corresponding quaternary ammonium salt, that is N,N,N-triethyl-N-(1-ethyl-1,4-dihydro-7-methyl-4-oxo-1,8-naphthyridin-3-yl)methylammonium iodide.

EXAMPLE 3

1-Ethyl-1,4-dihydro-7-methyl-4-oxo-1,8-naphthyridine-3-carboxylic acid

A suspension of 2.8 g. of 1-ethyl-3-diethylaminomethyl-1,4-dihydro-7-methyl-4-oxo-1,8-naphthyridine in 25 ml. of pyridine and 5 ml. of water is stirred and cooled to 10°C. in an ice bath. Solid potassium permanganate (5 g.) is added in small portions over the course of about 55 minutes. The temperature is not allowed to rise above 15°C. and small amounts of water totalling 25 ml. is added during the course of the addition. The resulting mixture is stirred about 30 minutes longer at 10°–20°C. and then filtered through infusorial earth. The cake of collected manganese dioxide is washed with a little water and the combined filtrates are treated with saturated aqueous sodium bisulfite solution until the excess permanganate is destroyed. The pale yellow solution is then acidified with excess 6N hydrochloric acid. After cooling in ice, the precipitated solid is collected by vacuum, rinsed with fresh water and sucked as dry as possible. The material is recrystallized from 12 ml. of dimethylformamide and dried for 18 hours in a vacuum oven (80°C.). There is obtained, as pale yellow crystals, 1-ethyl-1,4-dihydro-7-methyl-4-oxo-1,8-naphthyridine-3-carboxylic acid, m.p. 232°–234°C.

1-Ethyl-1,4-dihydro-7-methyl-4-oxo-1,8-naphthyridine-3-carboxylic acid also is obtained by following the above procedure but using a molar equivalent quantity of N,N,N-triethyl-N-(1-ethyl-1,4-dihydro-7-methyl-4-oxo-1,8-naphthyridin-3-yl)methylammonium iodide in place of the said corresponding 3-(diethylaminomethyl) compound.

Following the procedure described in Example 1 but using in place of 1,4-dihydro-7-methyl-4-oxo-1,8-naphthyridine and diethylamine molar equivalent quantities of the appropriate 1,4-dihydro-4-oxo-7-Q-1,8-naphthyridine and lower-secondary-amine ($R_1R_2NH$), respectively, the compounds of Examples 4–23 are obtained:

EXAMPLE 4

7-Ethyl-1,4-dihydro-3-dimethylaminomethyl-4-oxo-1,8-naphthyridine using 7-ethyl-1,4-dihydro-4-oxo-1,8-naphthyridine and dimethylamine.

EXAMPLE 5

3-(Ethylmethylaminomethyl)-1,4-dihydro-4-oxo-7-n-propyl-1,8-naphthyridine using 1,4-dihydro-4-oxo-7-n-propyl-1,8-naphthyridine and ethylmethylamine (i.e., $C_2H_5NHCH_3$).

EXAMPLE 6

3-(Di-n-hexylaminomethyl)-1,4-dihydro-7-isobutyl-4-oxo-1,8-naphthyridine using 1,4-dihydro-7-isobutyl-4-oxo-1,8-naphthyridine and di-n-hexylamine.

EXAMPLE 7

7-n-Hexyl-1,4-dihydro-3-(diisopropylmethyl)-4-oxo-1,8-naphthyridine using 7-n-hexyl-1,4-dihydro-4-oxo-1,8-naphthyridine and diisopropylamine.

EXAMPLE 8

1,4-Dihydro-7-methyl-3-dimethylaminomethyl-4-oxo-1,8-naphthyridine using 1,4-dihydro-7-methyl-4-oxo-1,8-naphthyridine and dimethylamine.

EXAMPLE 9

1,4-Dihydro-7-methyl-4-oxo-3-(piperidinomethyl)-1,8-naphthyridine using 1,4-dihydro-7-methyl-4-oxo-1,8-naphthyridine and piperidine.

EXAMPLE 10

1,4-Dihydro-7-methyl-4-oxo-3-(pyrrolidinomethyl)-1,8-naphthyridine using 1,4-dihydro-7-methyl-4-oxo-1,8-naphthyridine and pyrrolidine.

EXAMPLE 11

1,4-Dihydro-7-methyl-3-(morpholinomethyl)-4-oxo-1,8-naphthyridine using 1,4-dihydro-7-methyl-4-oxo-1,8-naphthyridine and morpholine.

EXAMPLE 12

7-Acetoxymethyl-3-diethylaminomethyl-1,4-dihydro-4-oxo-1,8-naphthyridine using 7-acetoxymethyl-1,4-dihydro-4-oxo-1,8-naphthyridine and diethylamine.

EXAMPLE 13

1,4-Dihydro-3-dimethylaminomethyl-4-oxo-7-propionoxymethyl-1,8-naphthyridine using 1,4-dihydro-4-oxo-7-propionoxymethyl-1,8-naphthyridine and dimethylamine.

EXAMPLE 14

3-Diethylaminomethyl-1,4-dihydro-7-isobutyroxymethyl-4-oxo-1,8-naphthyridine using 1,4-dihydro-7-isobutyroxymethyl-4-oxo-1,8-naphthyridine and diethylamine.

EXAMPLE 15

3-Diethylaminomethyl-7-hexanoyloxymethyl-1,4-dihydro-4-oxo-1,8-naphthyridine using 7-hexanoyloxymethyl-1,4-dihydro-4-oxo-1,8-naphthyridine and diethylamine.

EXAMPLE 16

3-Diethylaminomethyl-1,4-dihydro-4-oxo-7-(4-pyridyl)-1,8-naphthyridine using 1,4-dihydro-4-oxo-7-(4-pyridyl)-1,8-naphthyridine and diethylamine.

EXAMPLE 17

1,4-Dihydro-3-dimethylaminomethyl-4-oxo-7-(3-pyridyl)-1,8-naphthyridine using 1,4-dihydro-4-oxo-7-(3-pyridyl)-1,8-naphthyridine and dimethylamine.

EXAMPLE 18

1,4-Dihydro-3-dimethylaminomethyl-7-(2-methyl-4-pyridyl)-4-oxo-1,8-naphthyridine using 1,4-dihydro-7-(2-methyl-4-pyridyl)-4-oxo-1,8-naphthyridine and dimethylamine.

EXAMPLE 19

3-Diethylaminomethyl-1,4-dihydro-7-(3-methyl-4-pyridyl)-1,8-naphthyridine using 1,4-dihydro-7-(3-methyl-4-pyridyl)-4-oxo-1,8-naphthyridine and diethylamine.

EXAMPLE 20

3-Diethylaminomethyl-7-(2-ethyl-4-pyridyl)-1,4-dihydro-4-oxo-1,8-naphthyridine using 7-(2-ethyl-4-pyridyl)-1,4-dihydro-4-oxo-1,8-naphthyridine and diethylamine.

EXAMPLE 21

3-Diethylaminomethyl-7-(3-ethyl-4-pyridyl)-1,4-dihydro-4-oxo-1,8-naphthyridine using 7-(3-ethyl-4-pyridyl)-1,4-dihydro-4-oxo-1,8-naphthyridine and diethylamine.

EXAMPLE 22

3-Diethylaminomethyl-1,4-dihydro-7-(2,6-dimethyl-4-pyridyl)-4-oxo-1,8-naphthyridine using 1,4-dihydro-7-(2,6-dimethyl-4-pyridyl)-4-oxo-1,8-naphthyridine and diethylamine.

EXAMPLE 23

3-Diethylaminomethyl-1,4-dihydro-7-(3,5-dimethyl-4-pyridyl)-4-oxo-1,8-naphthyridine using 1,4-dihydro-7-(3,5-dimethyl-4-pyridyl)-4-oxo-1,8-naphthyridine and diethylamine.

Following the procedure described in Example 2 but using in place of 3-diethylaminomethyl-1,4-dihydro-7-methyl-4-oxo-1,8-naphthyridine a molar equivalent quantity of the appropriate 1,4-dihydro-3-($R_1R_2NCH_2$)-4-oxo-7-Q-1,8-naphthyridine (II), the compounds of Examples 24–43 are obtained:

EXAMPLE 24

1,7-Diethyl-1,4-dihydro-3-dimethylaminomethyl-4-oxo-1,8-naphthyridine using 7-ethyl-1,4-dihydro-3-dimethylaminomethyl-4-oxo-1,8-naphthyridine. Similarly, using said 7-ethyl compound and a molar equivalent quantity of dimethyl sulfate, n-propyl iodide, isobutyl bromide or n-hexyl chloride in place of ethyl iodide, there is obtained 7-ethyl-1,4-dihydro-1-methyl-3-dimethylaminomethyl-4-oxo-1,8-naphthyridine, 7-ethyl-1,4-dihydro-3-dimethylaminomethyl-4-oxo-1-n-propyl-1,8-naphthyridine, 7-ethyl-1,4-dihydro-1-isobutyl-3-dimethylaminomethyl-4-oxo-1,8-naphthyridine or 7-ethyl-1-n-hexyl-1,4-dihydro-3-dimethylaminomethyl-4-oxo-1,8-naphthyridine, respectively.

EXAMPLE 25

1-Ethyl-3-(ethylmethylaminomethyl)-1,4-dihydro-4-oxo-7-n-propyl-1,8-naphthyridine using 3-(ethylmethylaminomethyl)-1,4-dihydro-4-oxo-7-n-propyl-1,8-naphthyridine.

EXAMPLE 26

1-Ethyl-3-(di-n-hexylaminomethyl)-1,4-dihydro-7-isobutyl-4-oxo-1,8-naphthyridine using 3-(di-n-hexylaminomethyl)-1,4-dihydro-7-isobutyl-4-oxo-1,8-naphthyridine.

EXAMPLE 27

1-Ethyl-7-n-hexyl-3-(diisopropylaminomethyl)-1,4-dihydro-4-oxo-1,8-naphthyridine using 7-n-hexyl-1,4-dihydro-3-(diisopropylaminomethyl)-4-oxo-1,8-naphthyridine.

EXAMPLE 28

1-Ethyl-1,4-dihydro-7-methyl-3-dimethylaminomethyl-4-oxo-1,8-naphthyridine using 1,4-dihydro-7-methyl-3-dimethylaminomethyl-4-oxo-1,8-naphthyridine.

EXAMPLE 29

1-Ethyl-1,4-dihydro-7-methyl-4-oxo-3-(piperidinomethyl)-1,8-naphthyridine using 1,4-dihydro-7-methyl-4-oxo-3-(piperidinomethyl)-1,8-naphthyridine.

EXAMPLE 30

1-Ethyl-1,4-dihydro-7-methyl-4-oxo-3-(pyrrolidinomethyl)-1,8-naphthyridine using 1,4-dihydro-7-methyl-4-oxo-3-(pyrrolidinomethyl)-1,8-naphthyridine.

EXAMPLE 31

1-Ethyl-1,4-dihydro-7-methyl-3-(morpholinomethyl)-4-oxo-1,8-naphthyridine using 1,4-dihydro-7-methyl-3-(morpholinomethyl)-4-oxo-1,8-naphthyridine.

EXAMPLE 32

7-Acetoxymethyl-1-ethyl-3-diethylaminomethyl-1,4-dihydro-4-oxo-1,8-naphthyridine using 7-acetoxymethyl-3-diethylaminomethyl-1,4-dihydro-4-oxo-1,8-naphthyridine. Similarly, using said 7- acetoxymethyl compound and a molar equivalent quantity of dimethyl sulfate, n-propyl iodide, isobutyl bromide or n-hexyl chloride in place of ethyl iodide, there is obtained 7-acetoxymethyl-3-diethylaminomethyl-1,4-dihydro-1-methyl-4-oxo-1,8-naphthyridine, 7-acetoxymethyl-3-diethylaminomethyl-1,4-dihydro-4-oxo-1-n-propyl-1,8-naphthyridine, 7-acetoxymethyl-3-diethylaminomethyl-1,41-isobutyl-4-oxo-1,8-naphthyridine or 7-acetoxymethyl-3-diethylaminomethyl-1-n-hexyl-1,4-dihydro-4-oxo-1,8-naphthyridine, respectively.

EXAMPLE 33

1-Ethyl-1,4-dihydro-3-dimethylaminomethyl-4-oxo-7-propionoxymethyl-1,8-naphthyridine using 1,4-dihydro-3-dimethylaminomethyl-4-oxo-7-propionoxymethyl-1,8-naphthyridine.

EXAMPLE 34

1-Ethyl-3-diethylaminomethyl-1,4-dihydro-7-isobutyroxymethyl-4-oxo-1,8-naphthyridine using 3-diethylaminomethyl)-1,4-dihydro-7-isobutyroxymethyl-4-oxo-1,8-naphthyridine.

EXAMPLE 35

1-Ethyl-3-diethylaminomethyl-7-hexanoyloxymethyl-1,4-dihydro-4-oxo-1,8-naphthyridine using 3-diethylaminomethyl-7-hexanoyloxymethyl-1,4-dihydro-4-oxo-1,8-naphthyridine.

EXAMPLE 36

1-Ethyl-3-diethylaminomethyl-1,4-dihydro-4-oxo-7-(4-pyridyl)-1,8-naphthyridine using 3-diethylaminomethyl-1,4-dihydro-4-oxo-7-(4-pyridyl)-1,8-naphthyridine. Similarly, using said 7-(4-pyridyl) compound and a molar equivalent quantity of dimethyl sulfate, n-propyl iodide, isobutyl bromide or n-hexyl chloride in place of ethyl iodide, there is obtained 3-diethylaminomethyl-1,4-dihydro-1-methyl-4-oxo-7-(4-pyridyl)-1,8-naphthyridine-3-diethylaminomethyl-1,4-dihydro-4-oxo-1-n-propyl-7-(4-pyridyl)-1,8-naphthyridine, 3-diethylaminomethyl-1,4-dihydro-1-isobutyl-4-oxo-7-(4-pyridyl)-1,8-naphthyridine or 3-diethylaminomethyl-1-n-hexyl-1,4-dihydro-4-oxo-7-(4-pyridyl)-1,8-naphthyridine, respectively.

EXAMPLE 37

1-Ethyl-1,4-dihydro-3-dimethylaminomethyl-4-oxo-7-(3-pyridyl)-1,8-naphthyridine using 1,4-dihydro-3-dimethylaminomethyl-4-oxo-7-(3-pyridyl)-1,8-naphthyridine.

EXAMPLE 38

1-Ethyl-1,4-dihydro-3-dimethylaminomethyl-7-(2-methyl-4-pyridyl)-4-oxo-1,8-naphthyridine using 3-dimethylaminomethyl-1,4-dihydro-7-(2-methyl-4-pyridyl)-4-oxo-1,8-naphthyridine.

EXAMPLE 39

1-Ethyl-3-diethylaminomethyl-1,4-dihydro-7-(3-methyl-4-pyridyl)-1,8-naphthyridine using 3-diethylaminomethyl-1,4-dihydro-7-(3-methyl-4-pyridyl)-4-oxo-1,8-naphthyridine.

EXAMPLE 40

1-Ethyl-3-diethylaminomethyl-7-(2ethyl-4-pyridyl)-1,4-dihydro-4-oxo-1,8-naphthyridine using 3-diethylaminomethyl-7-(2-ethyl-4-pyridyl)-1,4-dihydro-4-oxo-1,8-naphthyridine.

EXAMPLE 41

1-Ethyl-3-diethylaminomethyl-7-(3-ethyl-4-pyridyl)-1,4-dihydro-4-oxo-1,8-naphthyridine using 3-diethylaminomethyl-7-(3-ethyl-4-pyridyl)-1,4-dihydro-4-oxo-1,8-naphthyridine.

EXAMPLE 42

1-Ethyl-3-diethylaminomethyl-1,4-dihydro-7-(2,6-dimethyl-4-pyridyl)-4-oxo-1,8-naphthyridine using 3-diethylaminomethyl-1,4-dihydro-7-(2,6-dimethyl-4-pyridyl)-4-oxo-1,8-naphthyridine.

EXAMPLE 43

1-Ethyl-3-diethylaminomethyl-1,4-dihydro-7-(3,5-dimethyl-4-pyridyl)-4-oxo-1,8-naphthyridine using 3-diethylaminomethyl-1,4-dihydro-7-(3,5-dimethyl-4-pyridyl)-4-oxo-1,8-naphthyridine.

Following the procedure described in Example 3 but using a molar equivalent quantity of the appropriate 1-alkyl-1,4-dihydro-3-($R_1R_2NCH_2$)-4-oxo-7-Q-1,8-naphthyridine in place of 1-ethyl-3-diethylaminoethyl-1,4-dihydro-7-methyl-4-oxo-1,8-naphthyridine, there are obtained the corresponding 1-alkyl-1,4-dihydro-4-oxo-7-Q-1,8-naphthyridine-3-carboxylic acids of Examples 44–75.

EXAMPLE 44

1,7-Diethyl-1,4-dihydro-4-oxo-1,8-naphthyridine-3-carboxylic acid using 1,7-diethyl-3-diethylaminomethyl-1,4-dihydro-4-oxo-1,8-naphthyridine.

EXAMPLE 45

7-Ethyl-1,4-dihydro-1-methyl-4-oxo-1,8-naphthyridine-3-carboxylic acid using 7-ethyl-1,4-dihydro-1-methyl-3-dimethylaminomethyl-4-oxo-1,8-naphthyridine.

EXAMPLE 46

7-Ethyl-1,4-dihydro-4-oxo-1-n-propyl-1,8-naphthyridine-3-carboxylic acid using 7-ethyl-1,4-dihydro-3-dimethylaminomethyl-4-oxo-1-n-propyl-1,8-naphthyridine.

EXAMPLE 47

7-Ethyl-1,4-dihydro-1-isobutyl-4-oxo-1,8-naphthyridine-3-carboxylic acid using 7-ethyl-1,4-dihydro-1-isobutyl-3-dimethylaminomethyl-4-oxo-1,8-naphthyridine.

EXAMPLE 48

7-Ethyl-1-n-hexyl-1,4-dihydro-4-oxo-1,8-naphthyridine-3-carboxylic acid using 7-ethyl-1-n-hexyl-1,4-dihydro-3-dimethylaminomethyl-4-oxo-1,8-naphthyridine.

EXAMPLE 49

1-Ethyl-1,4-dihydro-4-oxo-7-n-propyl-1,8-naphthyridine-3-carboxylic acid using 1-ethyl-3-(ethylmethylaminomethyl)-1,4-dihydro-4-oxo-7-n-propyl-1,8-naphthyridine.

EXAMPLE 50

1-Ethyl-1,4-dihydro-7-isobutyl-4-oxo-1,8-naphthyridine-3-carboxylic acid using 1-ethyl-3-(di-n-hexylaminomethyl)-1,4-dihydro-7-isobutyl-4-oxo-1,8-naphthyridine.

EXAMPLE 51

1-Ethyl-7-n-hexyl-1,4-dihydro-4-oxo-1,8-naphthyridine-3-carboxylic acid using 1-ethyl-7-n-hexyl-1,4-dihydro-3-(diisopropylaminomethyl)-4-oxo-1,8-naphthyridine.

EXAMPLE 52

1-Ethyl-1,4-dihydro-7-methyl-4-oxo-1,8-naphthyridine-3-carboxylic acid using 1-ethyl-1,4-dihydro-7-methyl-3-dimethylaminomethyl-4-oxo-1,8-naphthyridine.

EXAMPLE 53

1-Ethyl-1,4-dihydro-7-methyl-4-oxo-1,8-naphthyridine-3-carboxylic acid using 1-ethyl-1,4-dihydro-7-methyl-3-(piperidinomethyl)-4-oxo-1,8-naphthyridine.

EXAMPLE 54

1-Ethyl-1,4-dihydro-7-methyl-4-oxo-1,8-naphthyridine-3-carboxylic acid using 1-ethyl-1,4-dihydro-7-methyl-4-oxo-3-(pyrrolidinomethyl)-1,8-naphthyridine.

EXAMPLE 55

1-Ethyl-1,4-dihydro-7-methyl-4-oxo-1,8-naphthyridine-3-carboxylic acid using 1,4-dihydro-7-methyl-3-(morpholinomethyl)-4-oxo-1,8-naphthyridine.

EXAMPLE 56

7-Acetoxymethyl-1,4-dihydro-1-methyl-4-oxo-1,8-naphthyridine-3-carboxylic acid using 7-acetoxymethyl-3-diethylaminomethyl-1,4-dihydro-1-methyl-4-oxo-1,8-naphthyridine.

EXAMPLE 57

7-Acetoxymethyl-1,4-dihydro-4-oxo-1-n-propyl-1,8-naphthyridine-3-carboxylic acid using 7-acetoxymethyl-3-diethylaminomethyl-1,4-dihydro-4-oxo-1-n-propyl-1,8-naphthyridine.

EXAMPLE 58

7-Acetoxymethyl-1,4-dihydro-1-isobutyl-4-oxo-1,8-naphthyridine-3-carboxylic acid using 7-acetoxymethyl-3-diethylaminomethyl-1,4-dihydro-1-isobutyl-4-oxo-1,8-naphthyridine.

EXAMPLE 59

7-Acetoxymethyl-1-n-hexyl-1,4-dihydro-4-oxo-1,8-naphthyridine-3-carboxylic acid using 7-acetoxymethyl-3-diethylaminomethyl-1-n-hexyl-1,4-dihydro-4-oxo-1,8-naphthyridine.

EXAMPLE 60

7-Acetoxymethyl-1-ethyl-1,4-dihydro-4-oxo-1,8-naphthyridine-3-carboxylic acid using 7-acetoxymethyl-1-ethyl-3-diethylaminomethyl-1,4-dihydro-4-oxo-1,8-naphthyridine.

EXAMPLE 61

1-Ethyl-1,4-dihydro-4-oxo-7-propionoxymethyl-1,8-naphthyridine-3-carboxylic acid using 1-ethyl-3-diethylaminomethyl-1,4-dihydro-4-oxo-7-propionoxymethyl-1,8-naphthyridine.

EXAMPLE 62

1-Ethyl-1,4-dihydro-7-isobutyroxymethyl-4-oxo-1,8-naphthyridine-3-carboxylic acid using 1-ethyl-3-diethylaminomethyl-1,4-dihydro-7-isobutyroxymethyl-4-oxo-1,8-naphthyridine.

EXAMPLE 63

1-Ethyl-7-hexanoyloxymethyl-1,4-dihydro-4-oxo-1,8-naphthyridine-3-carboxylic acid using 1-ethyl-3-diethylaminomethyl-7-hexanoyloxymethyl-1,4-dihydro-4-oxo-1,8-naphthyridine.

EXAMPLE 64

1-Ethyl-1,4-dihydro-4-oxo-7-(4-pyridyl)-1,8-naphthyridine-3-carboxylic acid using 1-ethyl-3-diethylaminomethyl-1,4-dihydro-4-oxo-7-(4-pyridyl)-1,8-naphthyridine.

EXAMPLE 65

1,4-Dihydro-1-methyl-4-oxo-7-(4-pyridyl)-1,8-naphthyridine-3-carboxylic acid using 3-diethylaminomethyl-1,4-dihydro-1-methyl-4-oxo-7-(4-pyridyl)-1,8-naphthyridine.

EXAMPLE 66

1,4-Dihydro-4-oxo-1-n-propyl-7-(4-pyridyl)-1,8-naphthyridine-3-carboxylic acid using 3-diethylaminomethyl-1,4-dihydro-4-oxo-1-n-propyl-7-(4-pyridyl)-1,8-naphthyridine.

EXAMPLE 67

1,4-Dihydro-1-isobutyl-4-oxo-7-(4-pyridyl)-1,8-naphthyridine-3-carboxylic acid using 3-diethylaminomethyl-1,4-dihydro-1-isobutyl-4-oxo-7-(4-pyridyl)-1,8-naphthyridine.

EXAMPLE 68

1-n-Hexyl-1,4-dihydro-4-oxo-7-(4-pyridyl)-1,8-naphthyridine-3-carboxylic acid using 3-diethylaminomethyl-1-n-hexyl-1,4-dihydro-4-oxo-7-(4-pyridyl)-1,8-naphthyridine.

EXAMPLE 69

1-Ethyl-1,4-dihydro-4-oxo-7-(3-pyridyl)-1,8-naphthyridine-3-carboxylic acid using 1-ethyl-3-dimethylaminomethyl-1,4-dihydro-4-oxo-7-(3-pyridyl)-1,8-naphthyridine.

EXAMPLE 70

1-Ethyl-1,4-dihydro-7-(2-methyl-4-pyridyl)-4-oxo-1,8-naphthyridine-3-carboxylic acid using 1-ethyl-3-dimethylaminomethyl-1,4-dihydro-7-(2-methyl-4-pyridyl)-4-oxo-1,8-naphthyridine.

EXAMPLE 71

1-Ethyl-1,4-dihydro-7-(3-methyl-4-pyridyl)-1,8-naphthyridine-3-carboxylic acid using 1-ethyl-3-diethylaminomethyl-1,4-dihydro-7-(3-methyl-4-pyridyl)-1,8-naphthyridine.

EXAMPLE 72

1-Ethyl-7-(2-ethyl-4-pyridyl)-1,4-dihydro-4-oxo-1,8-naphthyridine-3-carboxylic acid using 1-ethyl-3-diethylaminomethyl-7-(2-ethyl-4-pyridyl)-1,4-dihydro-4-oxo-1,8-naphthyridine.

EXAMPLE 73

1-Ethyl-7-(3-ethyl-4-pyridyl)-1,4-dihydro-4-oxo-1,8-naphthyridine-3-carboxylic acid using 1-ethyl-3-diethylaminomethyl-7-(3-ethyl-4-pyridyl)-1,4-dihydro-4-oxo-1,8-naphthyridine.

EXAMPLE 74

1-Ethyl-1,4-dihydro-7-(2,6-dimethyl-4-pyridyl)-4-oxo-1,8-naphthyridine-3-carboxylic acid using 1-ethyl-3-diethylaminomethyl-1,4-dihydro-7-(2,6-dimethyl-4-pyridyl)-4-oxo-1,8-naphthyridine.

EXAMPLE 75

1-Ethyl-1,4-dihydro-7-(3,5-dimethyl-4-pyridyl)-4-oxo-1,8-naphthyridine-3-carboxylic acid using 1-ethyl-3-diethylaminomethyl-1,4-dihydro-7-(3,5-dimethyl-4-pyridyl)-4-oxo-1,8-naphthyridine.

The following Examples 76–122 illustrate the preparation of the intermediate 1,4-dihydro-4-oxo-7-Q-1,8-naphthyridines, said preparation being disclosed and claimed in copending U.S. Pat. appln. Ser. No. 453,927.

EXAMPLE 76

Cyclic isopropylidenyl N-(6-methyl-1-oxo-2-pyridyl)aminomethylenemalonate

To a solution containing 26.2 g. of cyclic isopropylidenyl N-(6-methyl-2-pyridyl)aminomethylenemalonate in 150 ml. of chloroform is slowly added with stirring 19 g. of 3-chloroperbenzoic acid, keeping the reaction temperature below about 40°C. After the addition is completed, the reaction mixture is heated on a steam bath for about 30 minutes. The reaction mixture is extracted successively with 50 ml. of ice cold 10% aqueous potassium bicarbonate solution, 70 ml. of water, 30 ml. of ice cold 10% aqueous potassium bicarbonate solution and 25 ml. of water. The resulting chloroform solution is washed with water, dried over anhydrous potassium carbonate, filtered and the filtrate concentrated in vacuo to remove the chloroform. The remaining solid is triturated with isopropyl alcohol and then recrystallized from ethanol using decolorizing charcoal to yield cyclic isopropylidenyl N-(6-methyl-1-oxo-2-pyridyl)aminomethylenemalonate, m.p. 222°–223°C. with decomposition.

The above preparation also is carried out using a molar equivalent quantity of other oxidizing agents in a suitable solvent inert under the reaction conditions, e.g., use of peracetic acid in acetic acid.

EXAMPLE 77

1,4-Dihydro-7-methyl-4-oxo-1,8-naphthyridine-8-oxide

To a 150 ml. portion of diethyl phthalate heated to 275°C. is added with stirring 2.78 g. of cyclic isopropylidenyl N-(6-methyl-1-oxo-2-pyridyl)aminomethylenemalonate. The stirred reaction mixture is heated at the same temperature for two minutes and then allowed to cool to room temperature. The precipitated solid is collected, washed well with ether and air-dried to yield the product, 1,4-dihydro-7-methyl-4-oxo-1,8-naphthyridine-8-oxide, which is tautomeric with 4-hydroxy-7-methyl-1,8-naphthyridine-8-oxide. Recrystallization, if desired, is carried out using dimethylformamide.

The above cyclization also is carried out in 225 ml. of refluxing Dowtherm A in place of the diethyl phthalate.

EXAMPLE 78

1,4-Dihydro-7-methyl-4-oxo-1,8-naphthyridine

A mixture containing 8.75 g. of 1,4-dihydro-7-methyl-4-oxo-1,8-naphthyridine-8-oxide, 250 ml. of absolute ethanol and 5 g. of Raney nickel is hydrogenated at about 25°C. in a Parr apparatus using an initial pressure of 55 p.s.i. of hydrogen. The catalyst is filtered off, the filtrate treated with decolorizing charcoal and filtered, and the filtrate concentrated in vacuo and chilled. The precipitate is collected, recrystallized from ethanol and dried over $P_2O_5$ at 25°C. overnight to yield 1,4-dihydro-7-methyl-4-oxo-1,8-naphthyridine, 235°–236°C. When recrystallized from water and dried, this compound melted at 235°–237°C.

Following the procedure described in Example 64 but using in place of cyclic isopropylidenyl N-(6-methyl-2-pyridyl)aminomethylenemalonate a molar equivalent quantity of the appropriate cyclic alkylidenyl N-(6-Q-2-pyridyl)aminomethylenemalonate, the compounds of Examples 79–93 are obtained:

EXAMPLE 79

Cyclic isopropylidenyl N-(6-ethyl-1-oxo-2-pyridyl)aminomethylenemalonate using cyclic isopropylidenyl N-(6-ethyl-2-pyridyl)aminomethylenemalonate, the latter prepared by reacting 2-amino-6-ethylpyridine with a mixture of triethyl orthoformate and cyclic isopropylidenyl malonate.

EXAMPLE 80

Cyclic isopropylidenyl N-(1-oxo-6-n-propyl-2-pyridyl)aminomethylenemalonate using cyclic isopropylidenyl N-(6-n-propyl-2-pyridyl)aminomethylenemalonate, the latter prepared by reacting 2-amino-6-n-propylpyridine with a mixture of triethyl orthoformate and cyclic isopropylidenyl malonate.

EXAMPLE 81

Cyclic isopropylidenyl N-(6-isopropyl-1-oxo-2-pyridyl)aminomethylenemalonate using cyclic isopropylidenyl N-(6-isopropyl-2-pyridyl)aminomethylenemalonate, the latter prepared by reacting 2-amino-6-isopropylpyridine with a mixture of triethyl orthoformate and cyclic isopropylidenyl malonate.

EXAMPLE 82

Cyclic isopropylidenyl N-(6-n-butyl-1-oxo-2-pyridyl-

)aminomethylenemalonate using cyclic isopropylidenyl N-(6-n-butyl-2-pyridyl)aminomethylenemalonate, the latter prepared by reacting 2-amino-6-n-butylpyridine with a mixture of triethyl orthoformate and cyclic isopropylidenyl malonate.

EXAMPLE 83

Cyclic isopropylidenyl N-(6-n-hexyl-1-oxo-2-pyridyl)aminomethylenemalonate using cyclic isopropylidenyl N-(6-n-hexyl-2-pyridyl)aminomethylenemalonate, the latter prepared by reacting 2-amino-6-n-hexylpyridine with a mixture of triethyl orthoformate and cyclic isopropylidenyl malonate.

EXAMPLE 84

Cyclic 3-pentylidenyl N-(6-methyl-1-oxo-2-pyridyl)aminomethylenemalonate using cyclic 3-pentylidenyl N-(6-methyl-2-pyridyl)aminomethylenemalonate, the latter prepared by reacting 2-amino-6-methylpyridine with a mixture of triethyl orthoformate and cyclic 3-pentylidenyl malonate.

EXAMPLE 85

Cyclic 2-butylidenyl N-(6-methyl-1-oxo-2-pyridyl)aminomethylenemalonate using cyclic 2-butylidenyl N-(6-methyl-2-pyridyl)aminomethylenemalonate, the latter prepared by reacting 2-amino-6-methylpyridine with a mixture of triethyl orthoformate and cyclic 2-butylidenyl malonate.

EXAMPLE 86

Cyclic 4-heptylidenyl N-(6-methyl-1-oxo-2-pyridyl)aminomethylenemalonate using cyclic 4-heptylidenyl N-(6-methyl-2-pyridyl)aminomethylenemalonate, the latter prepared by reacting 2-amino-6-methylpyridine with a mixture of triethyl orthoformate and cyclic 4-heptylidenyl malonate.

EXAMPLE 87

Cyclic isopropylidenyl N-[1-oxo-6-(1-oxo-4-pyridyl)-2-pyridyl]aminomethylenemalonate using cyclic isopropylidenyl N-[6-(4-pyridyl)-2-pyridyl]aminomethylenemalonate, the latter prepared by reacting 2-amino-6-(4-pyridyl)pyridine with a mixture of triethyl orthoformate and cyclic isopropylidenyl malonate.

EXAMPLE 88

Cyclic isopropylidenyl N-[1-oxo-6-(1-oxo-3-pyridyl)-2-pyridyl]aminomethylenemalonate using cyclic isopropylidenyl N-[6-(3-pyridyl)-2-pyridyl]aminomethylenemalonate, the latter prepared by reacting 2-amino-6-(3-pyridyl)pyridine with a mixture of triethyl orthoformate and cyclic isopropylidenyl malonate.

EXAMPLE 89

Cyclic isopropylidenyl N-[1-oxo-6-(2-methyl-1-oxo-4-pyridyl)-2-pyridyl]aminomethylenemalonate using cyclic isopropylidenyl N-[6-(2-methyl-4-pyridyl)-2-pyridyl]aminomethylenemalonate, the latter prepared by reacting 2-amino-6-(2-methyl-4-pyridyl)pyridine with a mixture of triethyl orthoformate and cyclic isopropylidenyl malonate.

EXAMPLE 90

Cyclic isopropylidenyl N-[1-oxo-6-(2-ethyl-1-oxo-4-pyridyl)-2-pyridyl]aminomethylenemalonate using cyclic isopropylidenyl N-[6-(2-ethyl-4-pyridyl)-2-pyridyl]aminomethylenemalonate, the latter prepared by reacting 2-amino-6-(2-ethyl-4-pyridyl)pyridine with a mixture of triethyl orthoformate and cyclic isopropylidenyl malonate.

EXAMPLE 91

Cyclic isopropylidenyl N-[1-oxo-6-(3-ethyl-1-oxo-4-pyridyl)-2-pyridyl]aminomethylenemalonate using cyclic isopropylidenyl N-[6-(3-ethyl-4-pyridyl)-2-pyridyl]aminomethylenemalonate, the latter prepared by reacting 2-amino-6-(3-ethyl-4-pyridyl)pyridine with a mixture of triethyl orthoformate and cyclic isopropylidenyl malonate.

EXAMPLE 92

Cyclic isopropylidenyl N-[1-oxo-6-(2,6-dimethyl-1-oxo-4-pyridyl)-2-pyridyl]aminomethylenemalonate using cyclic isopropylidenyl N-[6-(2,6-dimethyl-4-pyridyl)-2-pyridyl]aminomethylenemalonate, the latter prepared by reacting 2-amino-6-(2,6-dimethyl-4-pyridyl)pyridine with a mixture of triethyl orthoformate and cyclic isopropylidenyl malonate.

EXAMPLE 93

Cyclic isopropylidenyl N-[1-oxo-6-(3,5-dimethyl-1-oxo-4-pyridyl)-2-pyridyl]aminomethylenemalonate using cyclic isopropylidenyl N-[6-(3,5-dimethyl-4-pyridyl)-2-pyridyl]aminomethylenemalonate, the latter prepared by reacting 2-amino-6-(3,5-dimethyl-4-pyridyl)pyridine with a mixture of triethyl orthoformate and cyclic isopropylidenyl malonate.

Following the procedure described in Example 77 but using in place of cyclic isopropylidenyl N-(6-methyl-1-oxo-2-pyridyl)aminomethylenemalonate a molar equivalent quantity of the appropriate cyclic alkylidenyl N-(6-Q-1-oxo-2-pyridyl)aminomethylenemaonate, the compounds of Examples 94–109 are obtained:

EXAMPLE 94

7-Ethyl-1,4-dihydro-4-oxo-1,8-naphthyridine-8-oxide using cyclic isopropylidenyl N-(6-ethyl-1-oxo-2-pyridyl)aminomethylenemalonate.

EXAMPLE 95

1,4-Dihydro-4-oxo-7-n-propyl-1,8-naphthyridine-8-oxide using cyclic isopropylidenyl N-(1-oxo-6-n-propyl-2-pyridyl)aminomethylenemalonate.

EXAMPLE 96

1,4-Dihydro-7-isopropyl-4-oxo-1,8-naphthyridine-8-oxide using cyclic isopropylidenyl N-(6-isopropyl-1-oxo-2-pyridyl)aminomethylenemalonate.

EXAMPLE 97

7-n-Butyl-1,4-dihydro-4-oxo-1,8-naphthyridine-8-oxide using cyclic isopropylidenyl N-(6-n-butyl-1-oxo-2-pyridyl)aminomethylemalonate.

EXAMPLE 98

7-n-Hexyl-1,4-dihydro-4-oxo-1,8-naphthyridine-8-oxide using cyclic isopropylidenyl N-(6-n-hexyl-1-oxo-2-pyridyl)aminomethylenemalonate.

EXAMPLE 99

1,4-Dihydro-7-methyl-4-oxo-1,8-naphthyridine-8-oxide using cyclic 3-pentylidenyl N-(6-methyl-1-oxo-2-pyridyl)aminomethylenemalonate.

EXAMPLE 100

1,4-Dihydro-7-methyl-4-oxo-1,8-naphthyridine-8-oxide using cyclic 2-butylidenyl N-(6-methyl-1-oxo-2-pyridyl)aminomethylenemalonate.

EXAMPLE 101

1,4-Dihydro-7-methyl-4-oxo-1,8-naphthyridine-8-oxide using cyclic 4-heptylidenyl N-(6-methyl-1-oxo-2-pyridyl)aminomethylenemalonate.

EXAMPLE 102

1,4-Dihydro-4-oxo-7-(1-oxo-4-pyridyl)-1,8-naphthyridine-8-oxide using cyclic isopropylidenyl N-[1-oxo-6-(1-oxo-4-pyridyl)-2-pyridyl]aminomethylenemalonate.

EXAMPLE 103

1,4-Dihydro-4-oxo-7-(1-oxo-3-pyridyl)-1,8-naphthyridine-8-oxide using cyclic isopropylidenyl N-[1-oxo-6-(1-oxo-3-pyridyl)-2-pyridyl]aminomethylenemalonate.

EXAMPLE 104

1,4-Dihydro-4-oxo-7-(2-methyl-1-oxo-4-pyridyl)-1,8-naphthyridine-8-oxide using cyclic isopropylidenyl N-[1-oxo-6-(2-methyl-1-oxo-4-pyridyl)-2-pyridyl]aminomethylene-malonate.

EXAMPLE 105

1,4-Dihydro-4-oxo-7-(3-methyl-1-oxo-4-pyridyl)-1,8-naphthyridine-8-oxide using cyclic isopropylidenyl N-[1-oxo-6-(3-methyl-1-oxo-4-pyridyl)-2-pyridyl]aminomethylenemalonate.

EXAMPLE 106

1,4-Dihydro-4-oxo-7-(2-ethyl-1-oxo-4-pyridyl)-1,8-naphthyridine-8-oxide using cyclic isopropylidenyl N-[1-oxo-6-(2-ethyl-1-oxo-4-pyridyl)-2-pyridyl]aminomethylenemalonate.

EXAMPLE 107

1,4-Dihydro-4-oxo-7-(3-ethyl-1-oxo-4-pyridyl)-1,8-naphthyridine-8-oxide using cyclic isopropylidenyl N-[1-oxo-6-(3-ethyl-1-oxo-4-pyridyl)-2-pyridyl]aminomethylenemalonate.

EXAMPLE 108

1,4-Dihydro-4-oxo-7-(2,6-dimethyl-1-oxo-4-pyridyl)-1,8-naphthyridine-8-oxide using cyclic isopropylidenyl N-[1-oxo-6-(2,6-dimethyl-1-oxo-4-pyridyl)-2-pyridyl]aminomethylenemalonate.

EXAMPLE 109

1,4-Dihydro-4-oxo-7-(3,5-dimethyl-1-oxo-4-pyridyl)-1,8-naphthyridine-8-oxide using cyclic isopropylidenyl N-[1-oxo-6-(3,5-dimethyl-1-oxo-4-pyridyl)-2-pyridyl]aminomethylenemalonate.

Following the procedure described in Example 78 but using in place of 1,4-dihydro-7-methyl-4-oxo-1,8-naphthyridine-8-oxide a molar equivalent quantity of the appropriate 1,4-dihydro-7-Q-4-oxo-1,8-naphthyridine-8-oxide, the compounds of Examples 110–122 are produced:

EXAMPLE 110

7-Ethyl-1,4-dihydro-4-oxo-1,8-naphthyridine using 7-ethyl-1,4-dihydro-4-oxo-1,8-naphthyridine-8-oxide.

EXAMPLE 111

1,4-Dihydro-4-oxo-7-n-propyl-1,8-naphthyridine using 1,4-dihydro-4-oxo-7-n-propyl-1,8-naphthyridine-8-oxide.

EXAMPLE 112

1,4-Dihydro-7-isopropyl-4-oxo-1,8-naphthyridine using 1,4-dihydro-7-isopropyl-4-oxo-1,8-naphthyridine-8-oxide.

EXAMPLE 113

7-n-Butyl-1,4-dihydro-4-oxo-1,8-naphthyridine using 7-n-butyl-1,4-dihydro-4-oxo-1,8-naphthyridine-8-oxide.

EXAMPLE 114

7-n-Hexyl-1,4-dihydro-4-oxo-1,8-naphthyridine using 7-n-hexyl-1,4-dihydro-4-oxo-1,8-naphthyridine-8-oxide.

EXAMPLE 115

1,4-Dihydro-4-oxo-7-(4-pyridyl)-1,8-naphthyridine using 1,4-dihydro-4-oxo-7-(1-oxo-4-pyridyl)-1,8-naphthyridine-8-oxide.

EXAMPLE 116

1,4-Dihydro-4-oxo-7-(3-pyridyl)-1,8-naphthyridine using 1,4-dihydro-4-oxo-7-(1-oxo-3-pyridyl)-1,8-naphthyridine-8-oxide.

EXAMPLE 117

1,4-Dihydro-4-oxo-7-(2-methyl-4-pyridyl)-1,8-naphthyridine using 1,4-dihydro-4-oxo-7-(2-methyl-1-oxo-4-pyridyl)-1,8-naphthyridine-8-oxide.

EXAMPLE 118

1,4-Dihydro-4-oxo-7-(3-methyl-4-pyridyl)-1,8-naphthyridine using 1,4-dihydro-4-oxo-7-(3-methyl-1-oxo-4-pyridyl)-1,8-naphthyridine-8-oxide.

EXAMPLE 119

1,4-Dihydro-4-oxo-7-(2-ethyl-4-pyridyl)-1,8-naphthyridine using 1,4-dihydro-4-oxo-7-(2-ethyl-1-oxo-4-pyridyl)-1,8-naphthyridine-8-oxide.

EXAMPLE 120

1,4-Dihydro-4-oxo-7-(3-ethyl-4-pyridyl)-1,8-naphthyridine using 1,4-dihydro-4-oxo-7-(3-ethyl-1-oxo-4-pyridyl)-1,8-naphthyridine-8-oxide.

EXAMPLE 121

1,4-Dihydro-4-oxo-7-(2,6-dimethyl-4-pyridyl)-1,8-naphthyridine using 1,4-dihydro-4-oxo-7-(2,6-dimethyl-1-oxo-4-pyridyl)-1,8-naphthyridine-8-oxide.

EXAMPLE 122

1,4-Dihydro-4-oxo-7-(3,5-dimethyl-4-pyridyl)-1,8-naphthyridine using 1,4-dihydro-4-oxo-7-(3,5-dimethyl-1-oxo-4-pyridyl)-1,8-naphthyridine-8-oxide.

EXAMPLE 123

Following the procedure described in Example 1 using in place of 1,4-dihydro-7-methyl-4-oxo-1,8-naphthyridine a molar equivalent quantity of 1,4-dihydro-7-methyl-4-oxo-1,8-naphthyridine-8-oxide, there is obtained 3-diethylaminomethyl-1,4-dihydro-7-methyl-4-oxo-1,8-naphthyridine-8-oxide.

EXAMPLE 124

Following the procedure described in Example 3 using in place of 1-ethyl-3-diethylaminomethyl-1,4-dihydro-7-methyl-4-oxo-1,8-naphthyridine a molar equivalent quantity of 3-diethylaminomethyl-1,4-dihydro-7-methyl-4-oxo-1,8-naphthyridine-8-oxide, there is obtained 3-carboxy-1,4-dihydro-7-methyl-4-oxo-1,8-naphthyridine-8-oxide.

We claim:

1. The process which comprises reacting 1,4-dihydro-4-oxo-7-Q-1,8-naphthyridine with formaldehyde and a lower-secondary amine of the formula $R_1R_2NH$ to produce 1,4-dihydro-3-($R_1R_2NCH_2$)-4-oxo-7-Q-1,8-naphthyridine, reacting the latter with a lower-alkylating agent to produce 1-(lower-alkyl)-1,4-dihydro-3-($R_1R_2NCH_2$)-4-oxo-7-Q-1,8-naphthyridine, and reacting said 1-(lower-alkyl)-3-($R_1R_2NCH_2$) compound with a oxidizing agent capable of converting $-CH_2NR_1R_2$ to $-COOH$ to produce 1-(lower-alkyl)-1,4-dihydro-4-oxo-7-Q-1,8-naphthyridine-3-carboxylic acid, where Q is lower-alkyl, lower-alkanoyloxymethyl, 4(or 3)-pyridyl or 4(or 3)-pyridyl having one or two lower-alkyl substituents, and $R_1$ and $R_2$ are each lower-alkyl.

2. The process which comprises reacting 1,4-dihydro-4-oxo-7-Q-1,8-naphthyridine with formaldehyde and a lower-secondary amine of the formula $R_1R_2NH$ to produce 1,4-dihydro-3-($R_1R_2NCH_2$)-4-oxo-7-Q-1,8-naphthyridine, where Q is lower-alkyl, lower-alkanoyloxymethyl, 4(or 3)-pyridyl or 4(or 3)-pyridyl having one or two lower-alkyl substituents, and $R_1$ and $R_2$ are each lower-alkyl.

3. The process according to claim 1 where Q is methyl, $R_1$ and $R_2$ are each ethyl and the lower-alkylating agent is an ethylating agent to produce 1-ethyl-1,4-dihydro-7-methyl-4-oxo-1,8-naphthyridine-3-carboxylic acid.

4. The process according to claim 2 where Q is methyl, and $R_1$ and $R_2$ are each ethyl.

5. The process which comprises reacting 1,4-dihydro-7-methyl-4-oxo-1,8-naphthyridine-8-oxide formaldehyde and a lower-secondary amine of the formula $R_1R_2NH$ to produce 1,4-dihydro-3-($R_1R_2NCH_2$)-7-methyl-4-oxo-1,8-naphthyridine-8-oxide and reacting the latter with an oxidizing agent capable of converting $-CH_2NR_1R_2$ to $-COOH$ to produce 3-carboxy-1,4-dihydro-7-methyl-4-oxo-1,8-naphthyridine-8-oxide, and $R_1$ and $R_2$ are each lower-alkyl.

6. The process which comprises reacting 1,4-dihydro-7-methyl-4-oxo-1,8-naphthyridine-8-oxide formaldehyde and a lower-secondary amine of the formula $R_1R_2NH$ to produce 1,4-dihydro-3-($R_1R_2NCH_2$)-7-methyl-4-oxo-1,8-naphthyridine-8-oxide, and $R_1$ and $R_2$ are each lower-alkyl.

* * * * *